United States Patent
Shende et al.

(10) Patent No.: US 6,341,212 B1
(45) Date of Patent: Jan. 22, 2002

(54) SYSTEM AND METHOD FOR CERTIFYING INFORMATION TECHNOLOGY SKILL THROUGH INTERNET DISTRIBUTION EXAMINATION

(75) Inventors: Anil M. Shende, Roanoke; Linda N. Dalch, Richmond; Mark R. Warner, Alexandria, all of VA (US)

(73) Assignee: Virginia Foundation for Independent Colleges, Richmond, VA (US)

( * ) Notice: Subject to any disclaimer, the term of this patent is extended or adjusted under 35 U.S.C. 154(b) by 0 days.

(21) Appl. No.: 09/466,181

(22) Filed: Dec. 17, 1999

(51) Int. Cl.$^7$ ................................................. G09B 3/00
(52) U.S. Cl. ....................... 434/350; 434/118; 434/350; 434/322; 434/323; 434/219
(58) Field of Search ................................ 434/118, 350, 434/322, 323, 219

(56) References Cited

U.S. PATENT DOCUMENTS

| | | | | |
|---|---|---|---|---|
| 5,195,033 A | * | 3/1993 | Samph et al. | 434/323 X |
| 5,259,766 A | | 11/1993 | Sack et al. | |
| 5,788,504 A | * | 8/1998 | Rice et al. | 434/219 X |
| 5,823,781 A | * | 10/1998 | Hitchcock et al. | 434/118 X |
| 5,827,070 A | * | 10/1998 | Kershaw et al. | 434/322 X |
| 6,000,945 A | * | 12/1999 | Sanchez-Lazer | 434/322 X |
| 6,091,930 A | * | 7/2000 | Mortimer et al. | 434/362 X |
| 6,102,406 A | * | 8/2000 | Miles et al. | 273/430 X |
| 6,112,049 A | * | 8/2000 | Sonnenfeld | 434/350 X |
| 6,157,808 A | * | 12/2000 | Hollingsworth | 434/350 X |
| 6,190,178 B1 | * | 2/2001 | Oh | 434/323 X |
| 6,259,890 B1 | * | 7/2001 | Driscoll et al. | 434/350 X |
| 6,261,103 B1 | * | 7/2001 | Stephens et al. | 434/276 X |
| 6,263,439 B1 | * | 7/2001 | Hondros et al. | 713/182 X |

OTHER PUBLICATIONS

"TechCheck: IT Skills Testing." http://www.teckchek.com/ . 1999–2000.*

The General Test, http://www.gre.org/cbttest.html, Oct. 6, 1999.

* cited by examiner

Primary Examiner—John Edmund Rovnak
Assistant Examiner—Chanda Harris
(74) Attorney, Agent, or Firm—Hunton & Williams

(57) ABSTRACT

A system which contains a plurality of examinee systems connected over the Internet to an exam distribution server. The exam distribution server connects to an exam database system which contains a plurality of exam questions that have been approved by one or more exam question approvers. The exam database system may store a plurality of potential exam questions for each of a plurality of sections of the examination, including a section for web search and evaluation, a section for general computing concepts, a web page design section, a section for using presentation software, a section relating to spreadsheets and word processing, and a section relating to legal and ethical issues. An exam administrator system then generates an exam through an exam generation module that selects a predetermined number of questions in each of the predetermined sections of the examination and presents the proposed exam to the exam administration system. The exam administrator may then selectively substitute one or more questions from the exam database into the proposed examination, until the exam administrator is satisfied that the exam covers all of the topics that the exam administrator desires to cover. At that point, the exam administrator makes the exam available over the Internet to one or more of the plurality of examinee systems who may then take the exam over the Internet and store their submitted exam at the exam distribution server which in turn grades the exams for certification.

20 Claims, 8 Drawing Sheets

10 —
```
Part 1: Research and Applications

Section 1 - Web Search and Evaluation

Section 2 - General Computing Concepts

Part II - Web Design, Applications and Legal/Ethical Issues

Section 3 - Web Page Design

Section 4 - Using Presentation Software

Section 5 - Spreadsheets and Word Processing

Section 6 - Legal and Ethical Issues
```

Fig. 1

| APPROVED QUESTIONS ||
|---|---|
| Section | Available Questions |
| 1 | 1, 26, 36, 102, 902, 1033, 1096, 1099, 1252, 2057, 2098, 3015, 3402, 4000-4500 |
| 2 | 2, 27-35, 500-599, 2058-2097, 3000-3014, 5000-5500 |
| 3 | 3, 37-101, 600-656, 1097-1098, 1253-2056, 6000-6600 |
| 4 | 4, 103-199, 2058-2097, 7000-7500 |
| 5 | 5, 200-302, 3016-3307, 8000-8500 |
| 6 | 6-25, 303-499, 3403-3999, 9000-9500 |

Fig. 6

| Proposed Examination |||
|---|---|---|
| Section | # | Questions |
| 1 | 15 | 4000-4014 |
| 2 | 62 | 5000-5061 |
| 3 | 1 | 6023 |
| 4 | 1 | 2097 |
| 5 | 5 | 8000-8004 |
| 6 | 5 | 6-10 |

Fig. 7

| Final Examination Based on Exam Administrator ||| 
|---|---|---|
| Section | # | Questions |
| 1 | 15 | 4000-4006, 4008-4014, and 4500 |
| 2 | 62 | 5000-5015, 5018-5061, and 5400-5401 |
| 3 | 1 | 6023 |
| 4 | 1 | 2097 |
| 5 | 5 | 8000-8003 and 8500 |
| 6 | 5 | 9000-90004 |

Fig. 8

SYSTEM AND METHOD FOR CERTIFYING INFORMATION TECHNOLOGY SKILL THROUGH INTERNET DISTRIBUTION EXAMINATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

1. Field of the Invention

This invention relates to a system and method for examining students to certify higher-order problem solving and information technology skills, including web search and evaluation skills, understanding of general computing concepts, web page design skills, presentation software utilization skills, spreadsheet utilization skills, word processing software utilization skills, and legal and ethical issue understanding.

2. Background of the Invention

Businesses have grown increasingly reliant on the use of computers and other processing equipment to perform tasks. Accordingly, employers seek to hire employees who have at least a minimum level of skill in certain computer-related areas. This is particularly true for the growing number of high-tech companies that are particularly reliant on computers for internal communications, information distribution through intranets, and other operations. Indeed, whereas in the past, most companies have sought out employees with information technology skills only for technical jobs, such as engineering, computer programming specialists and the like, now businesses want to have employees with at least a minimal level of computer skills in almost every position, from marketing, sales, accounting, human resources and almost every other facet of the business.

Currently, employers have a difficult time determining whether a potential employee has the necessary computer skills that they desire for a particular job. Some employers require potential new hires to pass an examination to demonstrate their computer and other skills. These companies, however, must utilize valuable human resource time and energy to issue, grade and evaluate examinations for all potential employees. This is particularly true if a large number of applicants are being hired on a regular basis, such as at large corporations, where the turnover rate may be relatively high or the growth rate may be great. Additionally, from a potential employee's perspective, it is very time consuming to take an examination for every potential employer.

In addition to examinations issued by corporations, a number of examinations related to computer skills already exist. For example, many colleges and universities offer certain courses which teach various computer skills and base the grade for those courses on an examination. These courses, however, are often different in scope and coverage depending on the university, college, or private institution offering the examination. As a result, potential employers have a difficult time assessing the relative merits of one candidate versus another when their scores are based on different tests. For example, suppose one candidate got a "B" in a computer course at college A, but another candidate got a "C" in a different computer course at a different college. If the candidate who got a C in one college course took a much more difficult computer course, then that potential employee is at a significant disadvantage even though his or her skills in the computer area may even be greater than those of other candidates.

Also, start-up companies are typically small and do riot have the resources to determine potential employees' skill, nor do they have the resources to train new employees.

Additionally, there are programs that offer certifications for individuals who demonstrate skills for using particular software packages. These certification programs generally are very specific to a particular software package and do not demonstrate an individual's broad-based understanding of various computer skills.

Existing systems suffer from these and other drawbacks and disadvantages.

SUMMARY OF THE INVENTION

It is an object of the present invention to overcome these and other drawbacks and disadvantages of existing systems.

AN object of the present invention is to provide a uniform computer skill certification examination that may be issued to a broad-based population of potential employees.

Another object of the present invention is to provide a computer skills examination that may be offered over the Internet to enable virtually anyone to participate in taking the examination.

Another object of the present invention is to provide an examination that measures both higher order analytical skills combined with technology application skills.

Another object of the present invention is to provide a computer skills examination that determines an examinee's aptitude to search the World Wide Web (WWW or "web"0 for information, to evaluate web pages, to demonstrate a general understanding of computer concepts, to design a web page, to use presentation software, to utilize spreadsheet programs, to utilize word processing programs, to demonstrate an understanding of legal and ethical issues relating to computer technology, to utilize word processing programs, and to assimilate, evaluate and summarize information in an effective and presentable form using the WWW and various software tools.

Another object of the present invention is to provide a system in which a plurality of exam providers may cooperate to provide a computer certification examination for a number of different examinees.

Another object of the present invention is to provide a system in which exam providers may submit proposed exam questions to a host system for approval by one or more of a plurality of exam question approvers and then storing the approved exam questions in a database for later use when the exam is actually offered.

Another object of the present invention is to provide an exam generation system whereby stored and approved exam questions in a plurality of categories are generated into an examination for approval by an exam administrator. The exam administrator may then selectively substitute individual questions within each of one or more of the sections of the examination to provide the examination that is distributed over the Internet to examinees.

Another object of the present invention is to provide an exam generation system in which a predetermined number of questions in each of a plurality of sections of the examination are selectively chosen from approved questions designated for those sections and provided to an exam administrator for final approval before issuance to a plurality of examinees.

According to these and other objects of the present invention, a system is provided which contains a plurality of examinee systems connected over the Internet to an exam distribution server. The exam distribution server connects to an exam database system which contains a plurality of exam questions that have been approved by one or more exam question approvers. Periodically, exam question providers submit potential exam questions to the exam distribution server which are then distributed to question approvers for approval. All approved exam questions are then stored in the exam database system.

The exam database system may store a plurality of potential exam questions for each of a plurality of sections of the examination. According to one embodiment, these sections may include a section for web search and evaluation, a section for general computing concepts, a web page design section, a section for using presentation software, a section relating to spreadsheets and word processing, and a section relating to legal and ethical issues.

An exam administration system may also be provided that cooperates with the exam distribution server to selectively implement an exam that is offered over the Internet to the examinee systems.

In particular, the exam administrator system may request that an exam be generated by the exam distribution server. Upon a request, the exam distribution server selects a predetermined number of questions in each of the predetermined sections of the examination and presents the proposed exam to the exam administration system. The exam administrator may then selectively substitute one or more questions from the exam database into the proposed examination, until the exam administrator is satisfied that the exam covers all of the topics that the exam administrator desires to cover. At that point, the exam administrator makes the exam available over the Internet to one or more of the plurality of examinee systems who may then take the exam over the Internet and store their submitted exam at the exam distribution server which in turn grades the exams for certification.

Use of the system of the present invention provides a method of uniformly certifying examinee's computer usage skills. Accordingly, the certification program of the present invention may be used by employers throughout the country and throughout the world to determine an individual's skill set relating to basic computer and Internet-related skills.

In particular, of the six sections mentioned, each covers a skill set relating to present computer usage that would be advantageous to any employee at one or more of the employers. Particularly, the web search and evaluation section tests the examinee's ability to utilize existing web search tools to locate references and information on the World Wide Web. That section also tests the examinee's ability to utilize and understand web pages and to be able to evaluate those pages for various criteria. The second section, general computing concepts, may test the examinee's understanding of basic computer terminology, hardware, software, and how it operates. The third section may test the examinee's ability to create a web page. The fourth section may test the examinee's understanding of presentation software, and the examinee's ability to create simple presentations. The fifth section may test the examinee's ability to manipulate data within a spreadsheet and perform ordinary word processing tasks. The sixth section may test the exarninee's ability to understand legal and ethical issues relating to computers which is increasingly important in today's computer savy workplace.

Through the present examination, examinees may be tested on their understanding of the following: basic hardware, software and network concepts and the use of operating systems; their ability to determine the information requirements for a research question or problem and to be able to formulate and conduct effective searches of electronic and Internet-based resources; their ability to assess the usefulness and accuracy of information gathered in searches; their ability to use word processing software to create a document containing textual and tabular information; their ability to use spreadsheets to analyze data, discern trends and patterns, and perform basic statistical operations; their ability to understand the appropriate use of graphs and charts to aggregate and display information; their ability to use presentation software, to organize text and data and to design a persuasive presentation suitable for a certain audience; their ability to determine which technology tools are appropriate to retrieve, interpret, and present information in order to solve problems in a work environment; and their understanding of copyright, security, and privacy and ethical issues in the field of information technology.

These and other objects of the present invention will be readily appreciated by one of ordinary skill in the art upon reviewing the present disclosure.

BRIEF DESCRIPTION OF THE FIGURES

FIG. 1 depicts an examination according to one embodiment of the present invention.

FIG. 6 depicts a sample table of approved exam questions according to one embodiment of the present invention.

FIG. 7 depicts a sample proposal examination chart according to an embodiment of the present invention.

FIG. 8 depicts a chart of questions for a final examination according to an embodiment of the present invention.

DETAILED DESCRIPTION OF THE PRESENT INVENTION

Figure 2:
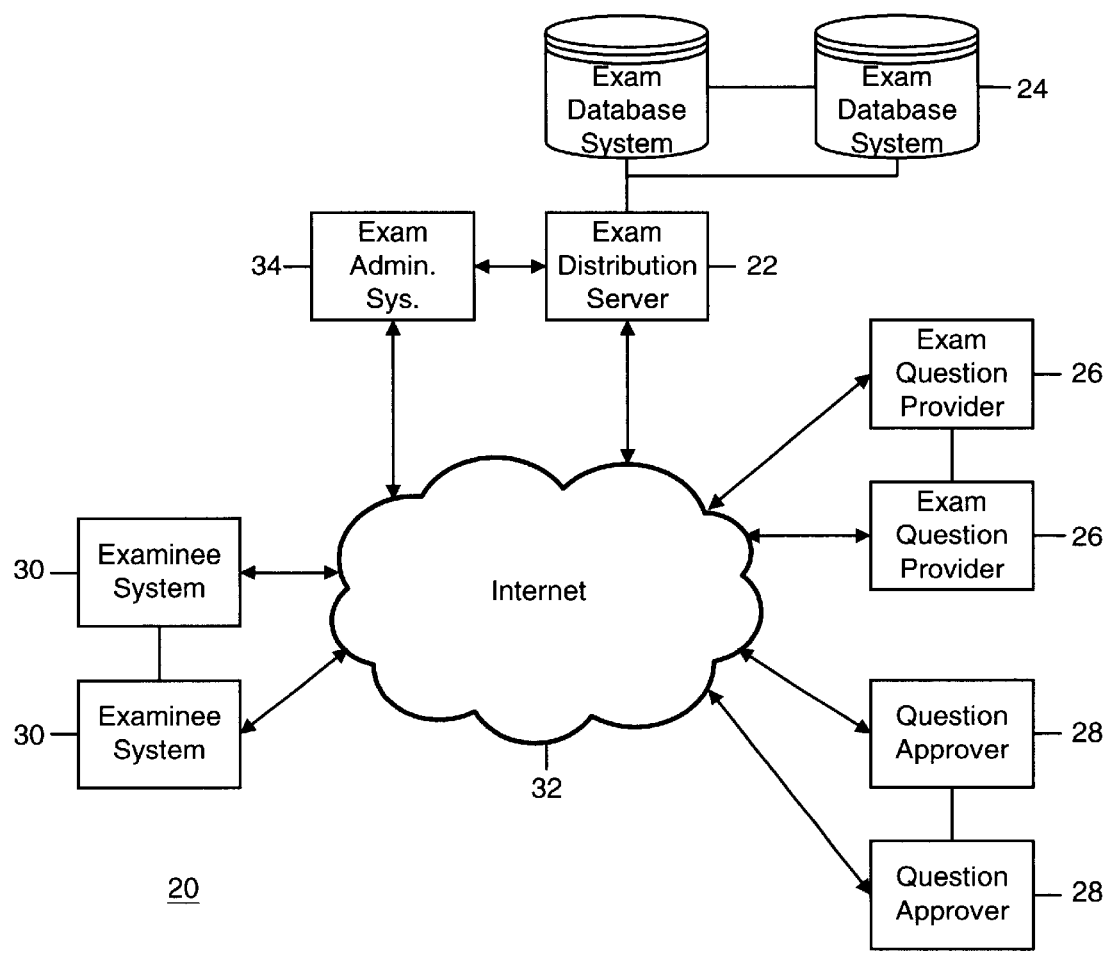
FIG. 2 depicts an exam distribution system according to one embodiment of the present invention.

According to one embodiment of the present invention, a system and method of certifying examinees on their computer and information technology skills and understanding is provided. An examination according to one embodiment of the present invention is attached as Appendix A to the present specification. This examination is representative of an examination, but should not be taken as limiting the present invention. Additionally, the specific examination is protected by copyright and no rights are granted herewith.

FIG. 1 depicts a high level embodiment of the sections of the examination of that embodiment. In particular, this examination has two parts. Part 1 relates to research and applications for computer systems. Part 2 relates to web design applications and legal and ethical issues. In part 1, there are two sections. Section 1 relates to web search and evaluation. Section 2 relates to general computing concepts. In part 2 there may be four sections. In section 3 of part 2, web page design is examined. In section 4 the examinee is tested on his or her ability to utilize presentation software. In section 5, the examinee is tested on his or her ability to utilize spreadsheets and word processing programs. Additionally, in section 6, the examinee is tested on his or her ability to understand legal and ethical issues relating to the computer and information technology industry.

Section 1—web search and evaluation—tests an examinee's ability to use an Internet browser and search engine to find answers to specific questions. Given several specific websites, examinees are also asked to determine bias, quality of information available on those sites and perspective of the website creator. For example, as depicted in Appendix A, the web search section may ask an examinee to determine the best way to find out which libraries own a particular reference book, or to determine what database is most likely to have information on a particular topic. Additionally an examinee may be asked to find specific information from any of a plurality of websites that may offer such information, such as questions 4–6 in Appendix A. Examinees may also be asked to evaluate various websites provided to the examinee and asked specific information about each of those plurality of websites. For example, the examinee may be asked, as disclosed in Appendix A, whether a particular website is sponsored by a particular corporate entity, whether the website has a financial interest in the topic, whether the website presents an impartial point of view, whether a site would be useful for preparing a report on legal issues, or whether a particular website is useful for a particular topic of interest. Again, these questions may determine the examinee's ability to determine bias, quality of information and perspective of the website creator.

In section 2, the examinee is tested on general computing concepts, including the ability to define computer terminology and troubleshoot various problems. In particular this section may deal mainly with telecommunications, network applications, technical terminology, problem solving in a technical environment, software and hardware components, and use of those various items. As depicted in Appendix A, various terminology may be tested to determine whether or not the examinee has an understanding of general computing concepts. Additionally, troubleshooting and problem solving questions may be provided. Also, the examinee may be tested to determine whether or not they understand various functions common to most word processing applications. This section may also comprise a section that asks questions relating to what Internet or web research tools would be most useful to a user based on a defined set of problems. This section may also include questions relating to ethical, legal and sociopolitical use of terminology.

In section 3 relating to web design, an examinee is tested on his or her ability to create a multi-page working website. For example, the examinee may be asked to create at least three pages for the website, all of which are linked to one another. On the first page, the main page of the site, the examinee may be asked to create the title of the website, at least one graphic, a statement of purpose that includes a document file, a link to the second page of the site, a link to the third page of the site, a link to an e-mail address and a test identification number and date. The second page of the web page may comprise a page containing specific information about a topic that is assigned to the examinee. This page may include the title of this page, a link to the first page, a link to the third page and a table, such as a spreadsheet table. The third page may comprise a page containing links. In this page, the examinee may be asked to provide a title for the page, a bulleted list of links to at least three or more outside websites, and a link to the first and second pages of the site being designed by the examinee. The examinee may then be asked to save the various html files on a diskette and then upload those files onto the database of the system administering the exam, as described in more detail below. An example of a section 3 question is provided in Appendix A.

The fourth section may test the examinee's ability to utilize presentation software to create an effective presentation, such as a multi-slide presentation about a given topic. For example, the examinee may be asked to create a four slide presentation, each slide of which should have the title at the very top of the slide, a footer that shows the name of the institution from which the examinee is taking the examination and a template (presentation design) with a plain background and correct spelling. In one embodiment, the first slide may request that the examinee provide a title, a subtitle and content, such as a photograph. The second slide may request that the examinee provide a title and content, which may comprise a bulleted list wherein certain specifications may be made for the presentation of the bullets and the content of the list. The third slide may request that the examinee provide a title, and content comprising a pie chart with a legend and percentages. The fourth slide may request that the examinee provide a title and content, which may comprise a clip art picture of a map, for example. The file may then be saved onto a diskette and then uploaded into the system of the present invention as described in greater detail below.

Section 5 may comprise a test to determine whether the examinee understands spreadsheets and word processing programs. In particular, this section of the examination may test the student's ability to analyze raw date, draw conclusions, create a spreadsheet, and graph pertinent data into another presentation format. Additionally, it tests the examinee's ability to create a document using a word processor and incorporate tables and graphs from another application software product. For example, as depicted in Appendix A, section 5 may have a portion with questions about spreadsheets that ask an examinee to download a particular spreadsheet file and prepare two sheets, one for analysis and one for chart. On the analysis sheet the examinee may be asked to construct a table using formulas to determine whether or not the examinee understands this process. On the second page, the examinee may be asked to create a chart plotting information from the spreadsheet into various data and then asked a series of questions based on the chart and analysis provided. In the word processing portion of this section, the examinee may be asked to utilize a different point size for a heading, to center the heading, to set a point size and font type for the body, create a narrative with a bulleted list in it, incorporate a table from the spreadsheet section and incorporate a chart from the spreadsheet section and save that as a new file.

The sixth section relating to legal and ethical issues may request that an examinee read a case study, ascertain legal issues involved, select appropriate behavior and define legal terms. For example, as depicted in Appendix A, the examinee may be given a factual scenario and asked to answer questions relating to the proper ethical and legal issues that arise as a result of those scenarios. The legal and ethical issues may also be folded into one of the other sections, such as the general concepts section. Also, the case study may not be provided in some forms of the examination.

The examination provided may be administered and distributed over the Internet to enable examinees to demonstrate their ability to utilize an Internet-based application to implement the examination. In particular, FIG. 2 depicts a system according to the present invention for distributing a computer skills examination according to the present invention. In particular, a plurality of examinee systems 30 may be connected over the Internet 32 to an exam distribution server 22. Exam distribution server 22 may be responsible for distributing an examination to one or more examinee systems 30 at an appropriate and selected time. Exam distribution server 22 may be connected to one or more exam database systems 24 as well.

According to one embodiment, examinee systems 30 may comprise a computer connected over the Internet to an exam distribution server 22. The examinee system 30 may comprise a system that has a web browser that allows students or other examinees to interface with the server using HTML documents and http protocols. It should also be understood that a different network environment other than Internet 32 may be provided as well. According to one embodiment, examinees may sign up to take the computer skills exam according to the present invention. In doing so the examinee may be issued an identification number and a password. Through use of the identification number and password, the examinee may be able to access the examination offered by the exam distribution server 22. If in person examination is used, photo identification may be used. In one embodiment, examinees attend various testing facilities. At the facility, the examinee enters a user name and password assigned by the examination. A proctor then verifies the identity of the examinee and then inputs a proctor name and password to log the examinee into the system. Other methods of verifying and authenticating examinees, monitoring the use of an examination and the like may be used according to known methods.

System 20 may also comprise a plurality of exam question providers 26 and question approvers 28 connected over the Internet to exam distribution server 22. Further, an exam administration system 34 may be provided that is connected over the Internet to each of these systems and also directly to the exam distribution server 22 according to one embodiment. Exam question providers 26 may create exam questions to be provided to the exam distribution server 22 for possible inclusion in future examinations. Additionally, question approvers 28 may be provided to authenticate or approve any proposed questions generated by exam question providers 26. It should be understood that exam question providers 26 and question approvers 28 may be a single entity or multiple entities.

Figure 3:
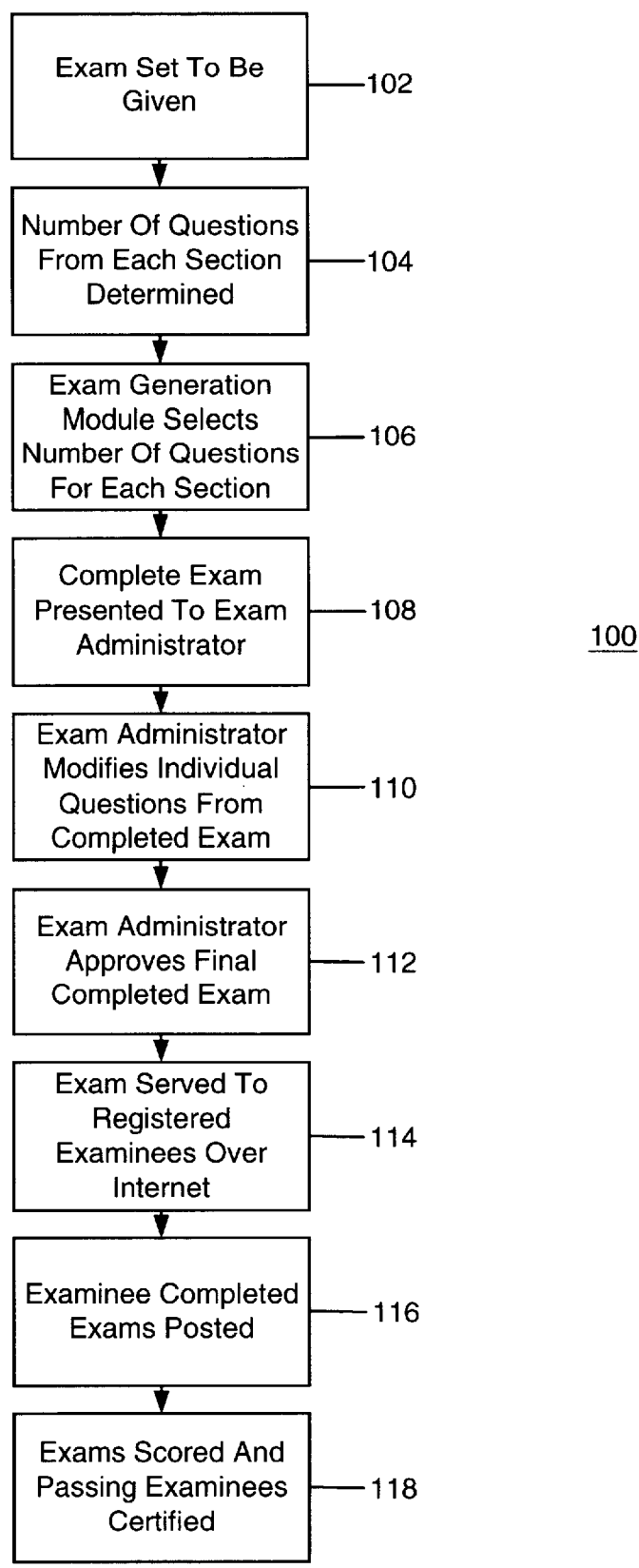
FIG. 3 depicts a method of generating an examination according to one embodiment of the present invention.

According to one embodiment of the present invention, system 20 may comprise a module that automatically creates an examination from approved exam questions stored in the database. Specifically, exam questions that have been approved may be stored for each of the plurality of sections of the examination. Whenever an exam is to be administered, a step may be taken to initiate the generation of an examination. That step may be manually performed or may be automatically performed by a computer, such as upon the occurrence of a predetermined schedule. The examination generation module may randomly select the correct number of questions for each of the sections. For example, if section one is to have 10 questions the exam generation module may randomly select 10 questions from the approved database for that particular section. Those questions may then be presented to an administrator who may determine whether to accept those suggested exam questions or substitute individual questions. FIG. 3 depicts a method 100 of administrating an exam according to an embodiment of the present invention.

In step 102, an examination time is set which initiates the following steps. In step 104, the number of questions from each section of the examination is determined and provided to the exam generation module. Next, in step 106, the exam generation module selects the number of questions for each section. As discussed above, this may be done through a random question selector, using historic information, using an artificial intelligence or even manually by a team or an individual selector. Additionally, the examination may differ for each examinee. Therefore, this process may be performed for each examinee to whom the exam is administered. In step 108, once a complete examination has been proposed, that exam is presented to an exam administrator. In step 110, the exam administrator may modify individual questions from the completed exam. In step 112, the exam administrator approves the final completed exam and in step 114, the exam is served the registered examinees over the Internet. In step 116, the examinees complete the exam and post their completed examination back to the exam distribution server. In step 118, the exam are scored and passing examinees are issued certifications.

Figure 4:
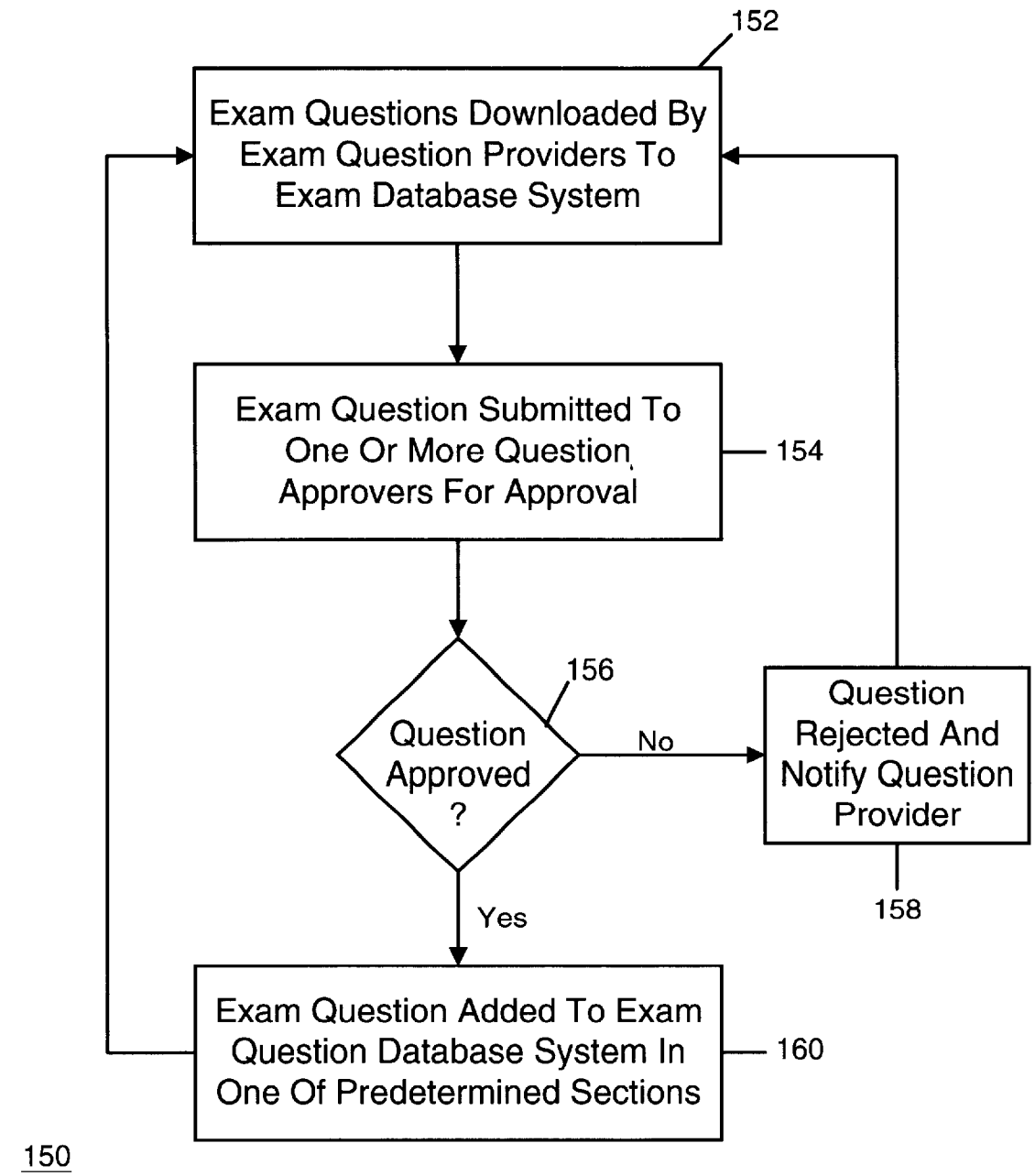
FIG. 4 depicts a method of creating exam questions for distribution according to one embodiment of the present invention.

FIG. 4 depicts a method 150 for enabling exam providers to download questions and store those exam questions in a database system. First, in step 152, exam questions are downloaded by exam question providers to exam database system through the exam distribution server. In step 154, exam questions are submitted to one or more question approvers for approval. Next, in step 156, if the question is approved by the correct number of approvers, then in step 160, the exam question is added to the exam question database system for one of the predetermined sections. In step 158, if the question is not approved, the question is rejected and the question provider may be notified. Step 156 may involve determining whether the predetermined number of approvers have approved a question. For example, if each question is to be submitted to five question approves, it may be desired that at least three of them approve the question. Alternatively, unanimous approval may be required according to the embodiment of the present invention. In any event, step 156 involves determining whether or not a predetermined criteria for approval has been met before an exam question is stored in the approved exam question database.

Step 160 may involve the process of storing an exam question for later use in an exam. As part of this process, the exam question may be stored in a separate database for approved exam questions. Also, because each question is to be provided in one of the plurality of sections of the examination, the exam question may be assigned a section. The section assignment may have been done by the question provider, may be done automatically by the system, may be done by an exam administer, or may be done through any other method desired for assigning a question to a section. In any event, the question may also be assigned an identifier so that it may be provided a unique identifier for use in generation of exams and other uses.

In step 152, exam questions may be downloaded to the exam database system through any of a plurality of mechanisms. For example, exam questions may be sent via http, e-mail, ftp, hand delivery or any other mechanisms for transmitting data over a network or external to a network. Step 152 involves the process of providing a question from one entity to another through any mechanism possible, although the preferred embodiment is to utilize the Internet and to provide the questions via either e-mail or ftp.

Similarly, step 154 also may preferably involve utilization of the Internet to e-mail or ftp proposed questions to question approvers to streamline the process of approving questions. Particularly, since the question approvers may be distributed across the country, the present invention may take advantage of the access that the Internet provides to enable question approvers to readily and easily access the data. As part of the question approval or submission process, verification and authentication techniques may be required to ensure that the questions being provided and approved are not accessed by potential examinees, thereby limiting cheating or other malfeasance in this process.

For example, every exam provider and exam approver may be assigned a username and password. An exam provider may only have access to exam questions that he or she provided and not to questions of other exam providers. The exam provider may be able to edit a question by supplying name and password information. The exam approver may only have access to exam questions for which he or she has been asked to provide approval. In some embodiments, an exam approver may be given access to all exam questions and in other embodiments, access may be limited to specific questions.

Also, only the exam administrator may be granted privileges to create an examination according to one embodiment of the present invention. The server on which the system is operating, such as exam administration system 34, may only store the username and password for the exam administrator to prevent others from logging into the system.

Figure 5:
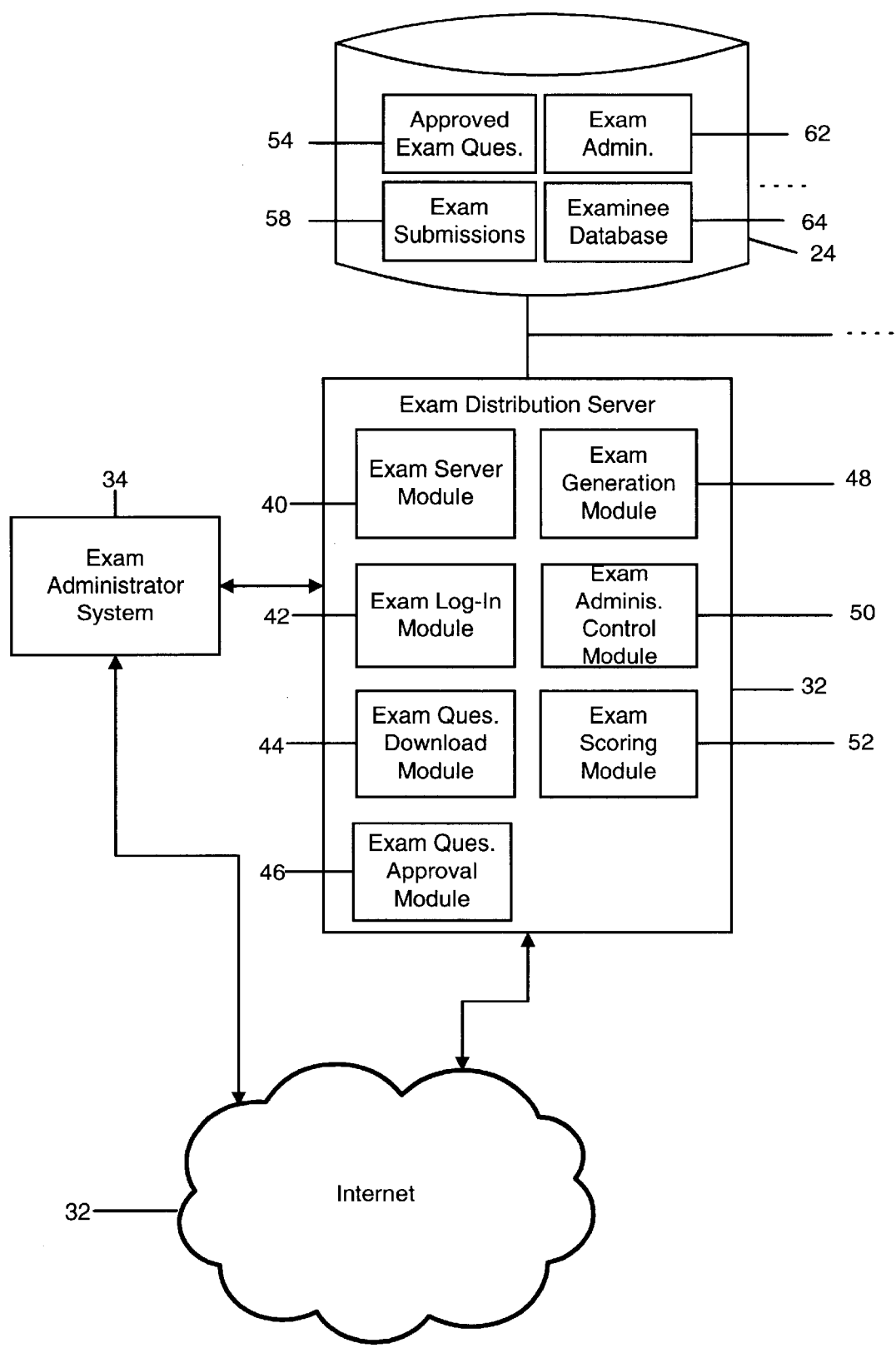
FIG. 5 depicts a more detailed embodiment of an exam distribution server in an exam data base system according to the embodiment of the present invention.

A more detailed depiction of system 20 of FIG. 2 is provided in FIG. 5. Particularly, more detail for the exam distribution server 32 and exam database system 24 is provided. As shown, exam distribution server 32 may comprise a plurality of modules to perform the various functions described above. Particularly, exam distribution sever 32 may comprise an exam server module 40, an examinee login module 42, an exam question download module 44, an exam question approval module 46, an exam generation module 48, an exam administration control module 50, and an exam scoring module 52. It should be understood that these modules may be combined into a single module and that additional modules may also be provided.

An exam server module 40 may be provided to access the database and distribute an examination to an examinee system 30. Exam server module 40 may handle a plurality of different examinee systems 30 simultaneously and may comprise a web server software module that operates on server equipment.

Prior to distributing an examination to an examinee system, exam server module 40 may initiate an examinee login module 42 that verifies the identity and authorization of an examinee to take the examination. As discussed above, a vast number of security, verification and authorization measures may be implemented through examinee login module 42 as desired to ensure fairness and accuracy in evaluating candidates. For example, a plurality of verification techniques may be implemented, depending on the equipment resident on the examinee systems. For example, handwriting, voice, retinal scan, fingerprint, photograph, and other means of identity verification may be implemented if appropriate equipment is resident at the examinee systems.

Exam question download module 44 may be provided to receive and store potential exam questions provided by the exam question providers. Exam question download module 44 may comprise an ftp module, e-mail, or any other receiving and storing mechanism. Exam questions that are received as potential questions may be passed to an exam question approval module 46 which controls and oversees distribution and approval of all proposed exam questions. Exam question approval module 46 may distribute electronic mail to a predetermined list of question approvers and coordinate storing responses. An administrator may also use this module to manually oversee the process of getting proposed questions approved.

An exam generation module 48 may be provided, as described above, to generate an examination from approved examination questions stored in the database. An exam administration control module 50 may be provided that enables an exam administrator to replace exam questions from proposed examinations generated by the exam generation module 48.

Also, an exam scoring module 52 may be provided that enables scoring of examinations submitted by the examinees. This exam scoring module 52 may automatically score multiple choice question portions of the examination and may submit other portions to appropriate graders for grading. For example, the exam scoring module 52 may automatically distribute files to exam scorers via ftp or email for scoring.

Exam database system 24 may comprise a database system that comprises a plurality of different database sections. According to one embodiment, the following sections may be provided: an approved exam question section 54, an exam submissions database 58, an exam administration database 62, and an examinee database 64. All of these database sections may be provided in a single database or may be separated into one or more databases that may or may not be linked together.

Approved exam question section 54 may comprise a database section that maintains approved exam questions for the exam generation module 48 to select for inclusion in an examination. This section may store the question, the section of the examination for which it is available, the exam provider that submitted the question, the results of exam approval (i.e., who reviewed and approved it), the dates it was provided and approved, whether the exam question has been used in an examination before, etc.

Exam submissions database 58 may comprise the section of a database where exam questions that have been provided, but still unapproved, are stored. Again, this section may comprise information including the question, the section of the examination for which it is available, the exam provider that submitted the question, the pending approval status (i.e., who the question was submitted to, whether they have approved the question, the number of votes until approval, etc.) the dates it was provided, etc.

Exam administration database 62 may comprise a database that stores one or more of the following: the identity of exam administrators, authorized actions to be taken, schedules, timing of administration, and other information related to the overall administration of the examination.

Examinee database 64 may comprise a database that stores information about the examinees that have taken or are scheduled to take the examination. This information may include contact information for the examinee, identification information, such as name, address, email address, class, major, GPA, ethnic background, number and name of computer classes attended, social security number, drivers' license number, student identification number, college or university, employer, and other information.

As discussed above, an exam administrator 34 may be able to selectively choose which of a plurality of questions to accept before approving the final examination. According to one embodiment of the present invention, FIG. 6 depicts an example of a database wherein six sections are provided in the available questions are provided, according to one embodiment, the proposed examination, as depicted in FIG. 7, may have been randomly generated wherein the appropriate number of questions have been selected for each of the sections. However, the exam administrator may not like or may desire to provide different questions than those selected by the automatic exam creation module. Accordingly, FIG. 8 depicts an example of a final examination based on the exam administrator. As shown between comparing FIGS. 7 and 8 with section 1, the exam administrator has substituted question 4500 for 4007. Also, in section 2, the exam administrator has substitute questions 5400 and 5401 for questions 5016 and 5017. Also, in section 5, the exam administrator has substituted question 8500 for question 8004. In section 6, the exam administrator has desired to replace all of the questions and has selected 9000 through 9004.

As part of this process, the exam administrator 34 may be presented with a graphical user interface that enables the exam administrator to see the complete examination and be able to select, cut, and paste sections between two windows on the screen. For example, the window on the left side of the screen may show the complete examination and the window on the right may show substitute questions that may be selected to replace a selected question based on the section of the selected question. Thereby, the exam administrator may be able to determine exactly what questions are being replaced for which questions -content for content. Other graphical user interfaces and systems may also be employed to enable the exam administrator to effectively and easily switch in and out questions on the fly.

According to a specific embodiment of the present invention, the examination may be administered by an association of colleges and universities to generate a standardized certification program for all students from the association. The examination providers may comprise professors and administrators at the various member institutions that submit questions to a committee for approval. The approval committee may also comprise professors and administrators of the member institutions. The examinees may comprise any student from the member institution that desires to have certification of his or her computer skills. The administrator may be selected to oversee this operation and may comprise an official elected from among the member institutions or may comprise a member of an organization that oversees the institutions. For example, the Virginia Foundation of Independent Colleges, the assignee of the present invention, may oversee the examination and enable all of the students of the member institutions to take the examination. Employers may then be able to determine the computer and information technology skills of students from those member institutions.

Other embodiments, uses, and advantages of the present invention will be apparent to those skilled in the art from consideration of the specification and practice of the invention disclosed herein. The specification and examples provided herein should be considered exemplary only. The intended scope of the invention is only limited by the claims appended hereto.

What is claimed is:

1. A method for certifying information technology skills for a plurality of examinees comprising the steps of:

generating an examination that tests the examinees' information technology skills in each of a plurality of sections, the sections comprising an Internet skills section and a computer application program utilization skills section, wherein the Internet skills section includes at least one question which asks the examinee to evaluate at least one web site for certain characteristics;

enabling examinees to access an examination server over a network to take the examination;

administering the examination generated from the examination server to the examinees over the network;

storing the examination results at the examination server;

scoring the examination; and issuing a certification to examinees that achieve a predetermined score on the examination, wherein the certification is utilized by a plurality of employers to determine a degree of competence in information technology skills.

2. The method of claim 1 further comprising the step of enabling an exam administrator to selectively replace exam questions from the generated exam.

3. The method of claim 1 wherein the plurality of sections comprises a web search and evaluation section, a general computing concepts section, a web page design section, a presentation software utilization section, a spreadsheet and word processing utilization section, and a legal and ethical issue section.

4. The method of claim 3 wherein the web search and evaluation section tests the examinee's ability to use an Internet browser and search engine to find information from websites and evaluate websites.

5. The method of claim 3 wherein the general computing concepts section tests the examinee's understanding of terminology and concepts relating to computers.

6. The method of claim 3 wherein the web design section tests the examinee's ability to create a working web site.

7. The method of claim 3 wherein the presentation software utilization section tests the examinee's ability to create a multi-slide presentation about a given topic.

8. The method of claim 3 wherein the spreadsheet and word processing utilization section tests the examinee's ability to create and analyze spreadsheet information.

9. The method of claim 3 wherein the spreadsheet and word processing utilization section tests the examinee's ability to create a document using a word processor and incorporate tables and graphs from another application software product.

10. The method of claim 3 wherein the legal and ethical issue section tests the examinee's understanding of ethical and legal issues relating to computers.

11. A method for testing information technology skills of a plurality of examinees that take an on-line examination over the Internet comprising the steps of:

creating a database of approved questions for use in creating the technology skills database, each approved question being assigned a predetermined section, the step of creating a database comprising the steps of:

authorizing a plurality of individuals to submit questions for inclusion in the examination;

receiving proposed questions from the authorized individuals through a secure connection over the Internet;

transmitting the proposed questions to a predetermined plurality of questions approvers over the Internet;

receiving evaluation of the proposed question from one or more of the predetermined plurality of question approvers; and when a predetermined approval rating is received, transferring the proposed question into the database of approved questions for inclusion in the examination;

generating an examination from approved questions, the examination comprising questions in the predetermined sections relating to Internet usage, computer terminology, and computer application program utilization;

enabling examinees to login over the Internet to a web server to receive the examination, wherein the examinees are asked to utilize the Internet to determine answers for one or more of the questions in the examination and are asked to utilize at least one computer application program to generate a file in response to at least one question;

receiving a completed examination in a plurality of sections at a web server location, the completed examination comprising a plurality of files responsive to the various sections, including at least one HTML file and at least one other computer application program file; and grading the examinations based on the completed examination and files received.

12. The method of claim 11 further comprising the step of enabling an exam administrator to selectively replace exam questions from the created exam.

13. The method of claim 11 wherein the plurality of sections comprises a web search and evaluation section, a general computing concepts section, a web page design section, a presentation software utilization section, a spreadsheet and word processing utilization section, and a legal and ethical issue section.

14. The method of claim 11 further comprising the step of enabling question providers to provide questions to be included in an examination, wherein the question providers specify the section for which the question is to be included.

15. The method of claim 14 further comprising the step of transmitting provided questions to at least five question approvers and waiting for approval by at least three question approvers before storing the questions in an approved question database for inclusion in an examination.

16. An internet-based certification system for certifying information technology skills for a plurality of examinees comprising:

exam generation means for generating an examination that tests the examinees' information technology skills in each of a plurality of sections, the sections comprising an Internet skills section and computer application program utilization skills section, wherein the Internet skills section includes at least one question which asks the examinee to evaluate at least one web site for certain characteristics;

a plurality of examinee systems that enable examinees to access an examination server over a network to take the examination;

an examination server system that transmits an examination to examinee systems over the Internet, receives from the examinee systems one or more files responsive to the examination;

scoring means for scoring the examination; and certification issuing means for issuing a certification to examinees that achieve a predetermined score on the examination, wherein the certification is utilized by a plurality of employers to determine a degree of competence in information technology skills.

17. The system of claim 16 further comprising an exam administrator system that enables an exam administrator to selectively replace exam questions from the created exam.

18. The system of claim 16 wherein the plurality of sections comprises a web search and evaluation section, a general computing concepts section, a web page design section, a presentation software utilization section, a spreadsheet and word processing utilization section, and a legal and ethical issue section.

19. The system of claim 16 further comprising question provider systems that provide questions to be included in an examination.

20. The system of claim 16 further comprising question approvers that approve questions transmitted by the question providers before those questions become available for delivery in the examination.

* * * * *